(12) United States Patent
Niemenmaa et al.

(10) Patent No.: US 7,218,940 B2
(45) Date of Patent: May 15, 2007

(54) PROVIDING LOCATION INFORMATION IN A VISITED NETWORK

(75) Inventors: Jarko Niemenmaa, Espoo (FI); Ville Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 143 days.

(21) Appl. No.: 10/787,972

(22) Filed: Feb. 27, 2004

(65) Prior Publication Data

US 2005/0153706 A1 Jul. 14, 2005

(30) Foreign Application Priority Data

Jan. 13, 2004 (FI) .................... 20040036

(51) Int. Cl.
*H04M 1/00* (2006.01)
(52) U.S. Cl. ................. 455/456.1; 455/456.6
(58) Field of Classification Search ............ 455/456.6, 455/456.1
See application file for complete search history.

(56) References Cited

U.S. PATENT DOCUMENTS 6,480,476 B1 * 11/2002 Willars ................. 370/311
6,850,760 B2 * 2/2005 De Nicolas ............ 455/433
2004/0058692 A1 * 3/2004 Kall et al. ............. 455/456.1
2005/0118999 A1 * 6/2005 Zhu .................... 455/432.1

FOREIGN PATENT DOCUMENTS

| WO | WO 03/045084 | 5/2003 |
| WO | WO 2004/004394 A1 | 1/2004 |
| WO | WO 2004/080096 A2 | 9/2004 |

* cited by examiner

*Primary Examiner*—Lester G. Kincaid
*Assistant Examiner*—Fred A. Casca
(74) *Attorney, Agent, or Firm*—Squire, Sanders & Dempsey L.L.P.

(57) ABSTRACT

A method for establishing a media for communications in association with a location information service provided in association with a communication system is disclosed. In the method a user equipment is provided with information enabling the user equipment to communicate on a user plane connection with at least one location service entity when the user equipment is visiting a communication network other than a home network of the user equipment. This information may then be used for establishment of a user plane connection in the visited communication network between the user equipment and a location service entity.

28 Claims, 5 Drawing Sheets

PROVIDING LOCATION INFORMATION IN A VISITED NETWORK

BACKGROUND OF THE INVENTION

1. Field of the Invention

The invention relates to location information services provided in association with a communication system, and in particular to communication of information when providing information about a location of a mobile user equipment visiting a network other than a home network.

2. Description of the Related Art

Various services can be provided for a user of a mobile user equipment by means of a communication system. Recent development in the field of mobile user equipment has lead to arrangements wherein information about the location of a mobile user equipment is determined and utilized when providing services for the user equipment or other parties. Such services are sometimes called location sensitive services.

A mobile user equipment may comprise, for example, a mobile telephone, a laptop computer, a personal data assistant or any other mobile station enabled for wireless communication with another station. An example of a communication system providing mobility for users thereof is the public land line mobile network (PLMN) or cellular network. Another example is a mobile communication system that is based, at least partially, on use of communication satellites. Wireless communications may also be provided by means of other arrangements, such as by means of local wireless area networks.

The skilled person is aware of the basic principles of a wireless communication system. A wireless communication system typically operates in accordance with a given standard or specification which sets out what the various elements of the system are permitted to do and how that should be achieved. For example, the standard or specification may define if the user, or more precisely, user equipment or terminal is provided with a circuit switched service or a packet switched service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable communication by means of the communication system.

A communication system needs to be able to provide various different functions in order be able to operate. These functions can be divided in different categories. A category comprises functions that relate to the actual carrying of communications such as voice or multimedia or other data content in the system. Another category can be seen as being formed by control or management functions such as the control of various services and the actual communication. Signaling associated with different functions is thus understood as being carried on different planes. For example, control messages are communicated on a control plane and the actual communication is transported on a user plane. The communication on the user plane is supported the signaling of the control messages on the control plane. The predefined rules commonly dictate the appropriate plane that shall be used for communication.

Typically the communication systems provide the different planes by means of separate channels, e.g. by means of separated signaling and communication channels. Such arrangements are employed e.g. by signaling system 7 (SS7) core networks and Q.931/GSM/WCDMA subscriber access. Therefore the term signaling channel may be used when referring to control plane communications. Similarly the term communication channel may be used when referring to user plane communications.

The various functions of communication systems may have developed quite independently from each other. Different protocols may also be used in different communication systems. The standards and protocols define e.g. which plane shall be used for a certain purpose.

The mobile network apparatus and/or user equipment can be employed for provision of information regarding the geographical location of the user equipment and thus the user thereof. A mobile user equipment and thus the user thereof can be positioned by various different techniques. For example, substantially accurate geographical location information that associates with a user equipment can be obtained based on a satellite based positioning system, for example the GPS (Global Positioning System) or Galileo. More accurate location information can be obtained through a differential GPS or an assisted GPS (A-GPS). In an approach the cells or similar geographically limited radio access entities and associated controllers of the communication system are utilized in production of an estimate concerning the location of a mobile user equipment. To improve the accuracy of the location information the communication system may be provided with additional equipment, for example specific location measurement units (LMUs), that provide more accurate data or additional data that may be used when locating of a user equipment.

It is also possible to conclude information about the geographical location of a user equipment when the user equipment is located outside a home network thereof, i.e. when the user equipment is located in a coverage area of a visited or "foreign" network. The visited network may be made capable of transmitting the location of the mobile user equipment back to the home network, e.g. to support services that are based on location information or for the purposes of routing and charging.

Location information may be used for various purposes, such as for location of a mobile telephone that has made an emergency call, for locating vehicles or given mobile subscribers for commercial purposes and so on. In general, a client (for example a user or another entity wishing to receive location information regarding a user may) may send a request for location information to the location service provision entity. An appropriate location service entity will then process the request, obtain the required data and generate an appropriate response.

Communication associated with location services may be signaled on the control plane and/or user plane, the selection depending on the application.

Applications that use control plane for communication of at least a part of information for location determination commonly employ embedded signaling protocols. Communications that associate with location information services may be communicated solely on the control plane. However, this may cause relatively high load on the control plane. This may be especially the case on the air interface between a mobile user equipment and a radio network servicing the mobile user equipment.

It has been proposed that a mobile user equipment could be located by using user plane signaling for communication of at least a part of location service information. Some of user plane applications are a kind of overlay solutions wherein a data connection is established on a user plane between a relevant server and a mobile user equipment to transfer on radio interface information that is needed in location determinations. The user plane data connection may be especially established for communication of location information. In another approach location information may be communicated on a user plane connection established for other purposes. The user plane signaling may be based on appropriate communication protocol, for example the Internet Protocol (IP) or data messages such as short message service messages. An example of the proposals presented in Open Mobile Alliance (OMA) wherein user plane is used is known by the work name 'Secure User Plane Location' (SUPL).

In practice a user plane location system requires that the mobile user equipment knows an address or other routing information for a user plane location server so that the mobile user equipment can exchange information with the server on the user plane. A user plane location server may also need to know the identity, such as the Mobile Subscriber Integrated Services Digital Number (MSISDN) or other identifier, of the mobile user equipment or other routing information in order to form a user plane connection to the mobile user equipment.

The proposal is believed to work satisfactorily when the user is in his/hers home network. However, problems may arise when a user is roaming in other networks. A roaming mobile user equipment may not know the address or other identity information related to the local user plane enabled location service entity, for example a local SUPL server. If a user equipment knows only the address of the home network location service entity, a problem is that the home network location service entity may not be able to provide assistance data relevant and valid in the roamed network. If a mobile station gets a location request from a user plane enabled location service entity while roaming, the user equipment may need to be able to trust that the location service entity is a legitimate entity allowed to request location information and to send assistance data.

As a more detailed example of the possible problems, lets consider a situation where a user who is a subscriber to a Finnish cellular network roams in a cellular network in the USA. The mobile user equipment of the user is not aware of the IP address of the local server, for example a local SUPL server, of the roamed network in the USA. The local server may nevertheless need the location of the roaming user equipment, for example in order to be able to provide the location of the roaming user equipment for emergency services. In the case of an emergency call the local server of the roamed network may try to request location information from the mobile user equipment, but the mobile user equipment does not know whether it can trust the origin of the request or not. Furthermore, if the mobile user equipment wants to get assistance data, it is possible in certain applications that the user equipment may only know the user plane address of a location service server in the home network in Finland. The home network server, however, may not have all assistance data that is needed for location in the USA.

SUMMARY OF THE INVENTION

Embodiments of the present invention aim to address one or several of the above problems.

According to one embodiment of the present invention, a method for establishing a media for communications in association with a location information service provided in association with a communication system comprises the step of providing a user equipment with information enabling the user equipment to communicate on a user plane connection with at least one location service entity when the user equipment is visiting a communication network other than a home network of the user equipment. This information may then be used for establishment of a user plane connection in the visited communication network between the user equipment and a location service entity.

According to another embodiment there is provided a location service arrangement for providing location information regarding a user equipment in communication with a communication system. The communication system comprises a plurality of networks, one of the networks being the home network of the user equipment and at least one other network being a network the user equipment is allowed to visit. The location service arrangement comprises a home location service entity of the user equipment and at least one further location service entity associated with at least one of said other networks. The arrangement is such that the user equipment is configured to use information regarding at least one user plane address of at least one location service entity and to communicate location service information on a user plane when visiting a network other than the home network.

According to yet another embodiment there is provided a user equipment configured for communication with at least two networks, one of the networks being the home network of the user equipment and at least one other network being a visited network. The user equipment is configured to use information regarding at least one user plane address of at least one location service entity and to communicate location service information on a user plane when visiting a network other than the home network.

The embodiments may enable employment of user plane communication of information associated with location services for a roaming user equipment in a visited network.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

Figure 1:
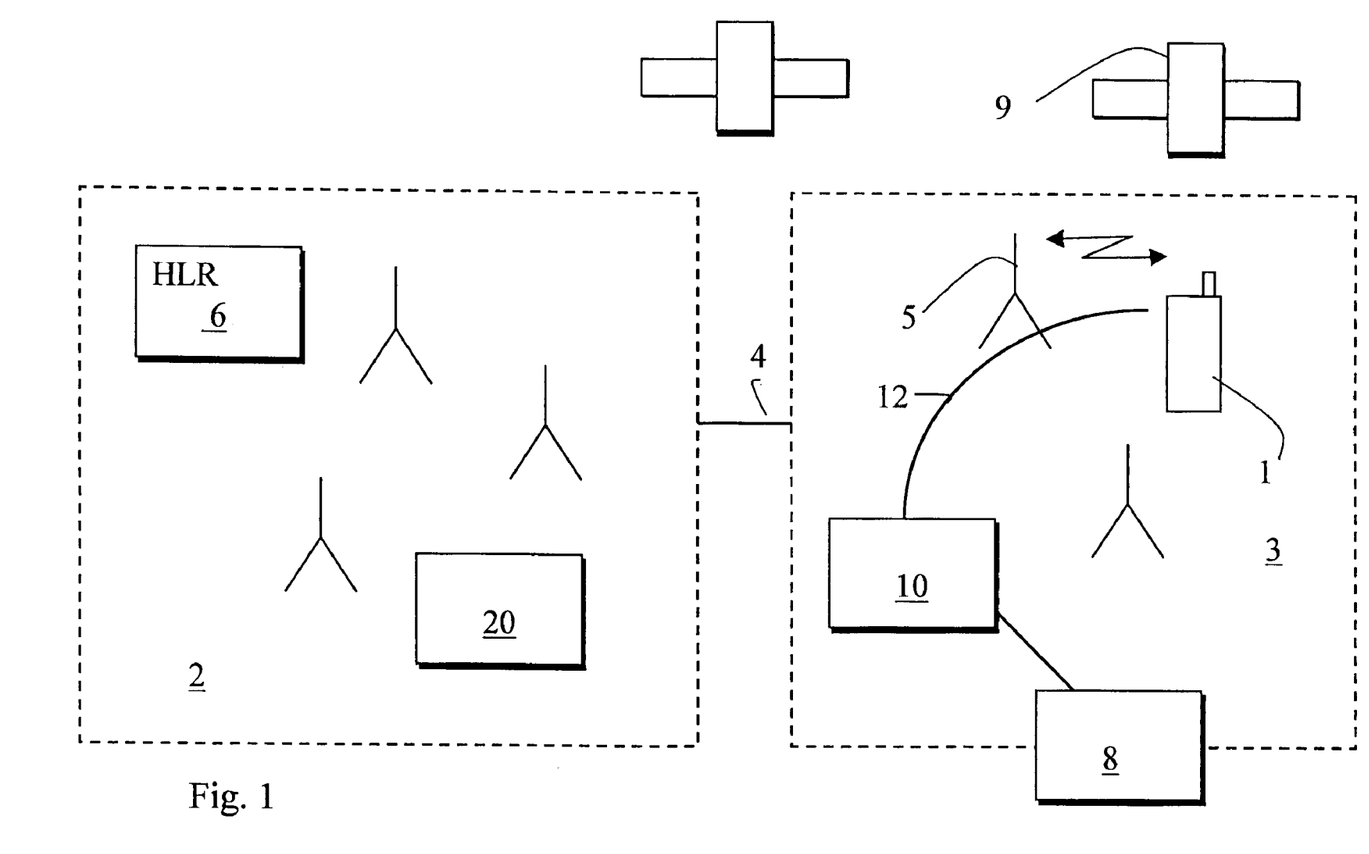
FIG. 1 shows a communication system wherein the present invention may be embodied.

Reference is first made to FIG. 1 which is a simplified presentation of a communication system in which the present invention may be embodied. It shall be appreciated that although this specification makes references to various elements associated with specific types of radio access networks and communication systems, these are shown and described only to facilitate the understanding of the invention. Similar functionalities may be provided by a number of alternative arrangements.

More particularly, FIG. 1 shows two cellular networks 2 and 3 providing mobility for a mobile user equipment 1. Network 2 is a home network of the user equipment 1, i.e. a network the user equipment 1 subscribes to. Network 3 is a visited network, i.e. a network the user equipment 1 has roamed into. An interface 4 is provided for connecting the networks.

Each of the networks 2 and 3 is provided with an appropriate number of radio access networks i.e. cells. The mobile user equipment 1 may communicate on a wireless interface with a base station 5 of a serving access network. Each of the base stations is commonly controlled by an access network controller. For example, a third generation (3G) radio access network controller (RNC) or a more conventional base station controller (BSC) of the second generation (2G) standards may be used for such purposes. The access network controller may be connected to appropriate core network entities of the cellular system, such as a MSC (mobile switching centre) and/or SGSN (serving general packet radio service support node), via a suitable interface arrangement.

The home network 2 of the user equipment 1 may also be provided with a home location register 6 or similar subscriber database.

Any appropriate mobile user equipment adapted for the communication with the access network may be used to connect the cellular network. For example, a user may access the cellular network by means of a user equipment such as a Personal computer (PC), Personal Data Assistant (PDA), mobile station (MS) such as a mobile phone and so on. One skilled in the art is familiar with the features and operation of a typical mobile user equipment such as a mobile station. Thus it is sufficient to note that a user may use a mobile user equipment for tasks such as for making and receiving phone calls, for receiving and sending data from and to the network and for experiencing e.g. multimedia content.

A user equipment within a radio access network may communicate with a radio network controller via radio network channels which are typically referred to as radio bearers (RB). Each user equipment may have one or more radio network channel open at any one time with the radio network controller.

A mobile user equipment is typically provided with processor and memory means for accomplishing these tasks. A mobile user equipment may include appropriate antenna elements for wirelessly receiving and transmitting signals from and to base stations of the mobile communication network. A mobile user equipment may also be provided with a display for displaying images and other graphical information for the user of the mobile user equipment. Speaker means may also be provided. The operation of a mobile user equipment may be controlled by means of an appropriate user interface such as control buttons, voice commands and so on.

It shall be appreciated that a number of user equipment may be in communication via the cellular system although only one mobile user equipment is shown in FIG. 1 for clarity.

The location of the mobile user equipment 1 may vary in time as the user equipment is free to move within the coverage area of a base station and also from a cell to another cell, and even from a network to another network. As mentioned above, the modern communication systems are capable of providing information regarding the geographical location of a user equipment. The geographical location may be defined, for example, on the basis of the position of the mobile user equipment relative to at least one base station and/or based on information from a satellite based system 9 or from other external location information resource. The geographical location of the user equipment may be defined, for example, in X and Y co-ordinates or in latitudes and longitudes. A possibility is to use the relation between defined radiuses and angles, e.g. based on the spherical coordinate system or alike. It is also possible to define the location of the base stations and/or mobile user equipment in vertical directions. For example, Z co-ordinate may be used when providing the location information in the vertical direction. The vertical location may be needed e.g. in mountainous environments or in cities with tall buildings.

FIG. 1 shows also a location service (LCS) client 8. A location service client may request for location information from the communication system. The location service client 8 can thus be seen as a logical functional entity that may make a request for location information of one or more target user equipment for what ever purposes. The location service client typically needs to be authorized in a predefined manner to be allowed receive at least some degree of information concerning location (or location history) of a target user equipment. A location service client 8 can be any entity that may make use of the location information. The location service client may be an entity that is external to the communication network. The location service client may also be an internal client (ILCS) i.e. reside in any entity or node (including a mobile user equipment) within the communication system. Examples of location service clients include service applications such as pure location information services, games wherein location information can be utilized, fleet management applications and emergency services. A location sensitive service application may use location information for various purposes, for example to enhance usability of the service or for content segmentation.

In order to provide location information, the communication system may be provided with various different means for determining the geographical location of a target user equipment. The location information may be obtained by using one or a plurality of appropriate location techniques. A location service entity may include capabilities such as functions for handling Service Area Identities (SAI), Assisted GPS (A-GPS) and OTDOA. A serving location service entity 10 may communicate with the user equipment 1, for example to request terminal based positioning information, to request terminal measurements or to deliver location services assistance data.

There are several ways how the location service entities may communicate with the user equipment on user plane. According to a preferred approach the location service entity and/or the user equipment is addressed by means of an IP address thereof. Use of IP addresses allows establishment of dedicated IP sessions between a user equipment and a location services entity.

The user equipment 1 may be adapted to perform location measurements and/or calculations, and thus the location determination may be performed at least partially at the user equipment 1. The user equipment may be configured to process information received from external sources. At least a part of the location information may be provided based on information provided by system that is separate from the communication system. For example, information may be provided by means of a satellite based system 9, such the Global Positioning System (GPS), differential GPS, Galileo or similar. The user equipment may be a GPS enabled terminal. That is, the user equipment may be provided with a GPS receiver and means for processing GPS data.

A location service (LCS) functionality in association with a communication system may be provided by various entities. The client 8 may send the request to a specific location service server comprising components and bearers needed to serve LCS clients. The server may provide a platform which will enable the support of location based services in parallel with other communication services such as speech, data, messaging, other teleservices, user applications and supplementary services. A location service server may thus provide the client, on request or periodically, the current or most recent geographic location (if available) of the target user equipment or, if the location fails, an error indication and optionally the reason for the failure.

A location service may be provided by various manners in association with a communication system. FIG. 1 shows an arrangement wherein a location service server 10 is provided in association with the network 3 and a location service 20 in association with the network 2. However, it is understood that a location service functionality associated with a network may comprise a number a location service entities, for example a controlling location service server in addition to at least one user plane location server. A non-limiting example of such arrangements is given in 3G specifications wherein a location service (LCS) server entity referred to as a Gateway Mobile Location Center (GMLC) is specified to provide an entity managing the location services. The GMLC is for gathering and storing various data that may be used in provision of location information for the location service clients (LCS clients). However, since a distributed location service is not required in all embodiments, only one location service entity per network is shown in FIG. 1.

Location data may be provided to an appropriate location service entity from various sources connected to the communication system. Location data may also be processed in the user equipment that is provided with appropriate processing capacity. The user equipment may then provide the location service entity or the client with processed data such as location co-ordinates.

It is possible to signal data on a user plane connection in association with location information services. For example, packet switched internet protocol (IP) user plane connection may be provided for such communication in parallel with another user plane communication media such as PDP (packet data protocol) context, data call, WLAN (Wireless LAN) communications and so on. Messages that relate to the providing location information, for example location information requests, responses and assistance data, may be delivered via a IP connection that has been established in response to a location request.

Communication of telecommunication traffic such as voice, data or multimedia content to and/or from the user equipment 1 visiting network 3 is carried on a user plane. Signaling of messages that support the actual communication are then carried on a control plane.

In the embodiments communication of information supporting the operation of a location information service may also be carried on the user plane between a user equipment 1 and a serving local location service entity 10. In such scenario a client application 8 may request for user position from a serving local location service entity 10. Subsequent to such request data may be communicated on a user plane IP session established between the mobile user equipment 1 and the local location service entity 10.

In FIG. 1 a user plane session 12 is shown as being established between the user equipment 1 and the location service entity 10 of the visited network 3. It shall be appreciated that a user plane IP session may also established between the user equipment 1 and a location service entity 20 of the home network 2 of the user equipment 1.

A GPS receiver 14 (see FIG. 3) may be integrated to the user equipment 1 in applications wherein the GPS is used for provision of the location information, for example in the so called Assisted GPS (A-GPS) methods. In such applications assistance data may need to be communicated from a network server to a GPS enabled user equipment to enhance the operation thereof. For example, sensitivity, coverage and response time may be enhanced by means of additional information assisting in the provisioning of the location data. The GPS assistance data for the A-GPS arrangement may be transferred to the user equipment using the user plane IP connection. The A-GPS assistance data may be transferred over the IP connection without any proprietary connection to an assistance server. It shall be appreciated that assistance data may be provided by an entity that may also perform at least a part of the required location calculation services.

It should be noted that some of the assisted GPS procedures in the user equipment may require initial rough location information estimate, for example a cell level knowledge of the position of the user equipment. This information may also be provided for the user equipment by means of the assistance data.

It is also possible that a GPS enabled user equipment produces GPS assistance data. The assistance data can then be reported to appropriate location service entities using a dedicated IP session.

Standard based protocol parameters may be used for the communications. For example, when collecting assistance data from the GPS enable user equipment the parameters can be based on the 3G definitions.

The following will describe some exemplifying embodiments with reference to emergency calls. Emergency calls are an example of calls wherein it may be necessary to establish the location of a party of the call such that the location determination procedure is initiated automatically in response to detection of the type of a call.

Figure 2:
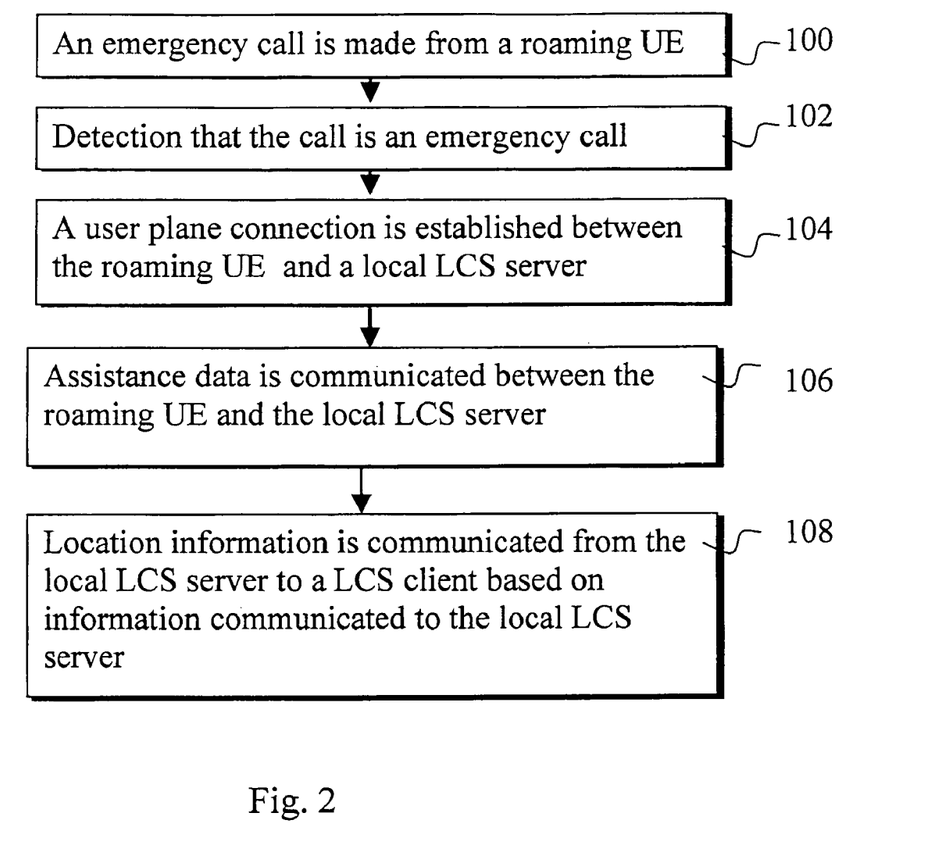
FIG. 2 is a flowchart illustrating the operation of one specific embodiment.

Reference is now made to the flowchart of FIG. 2 illustrating a possible flow of events in association with an emergency call made at step 100 by a user equipment. A mobile user equipment making a call may be configured to detect that the dialed number is an emergency call number. An emergency call associated location determination may then be based on a procedure including steps wherein at step 102 the user equipment detects that the call is an emergency call. The detection functionality may be provided by manners. For example, the user equipment may be provided with a table of general emergency numbers, for example a table including numbers 911, 112, 10022, 999 and so on. A controller may then monitor for the calls, and if a call is initiated to one of these numbers, it is concluded by the processor that the call is an emergency call.

If a mobile user equipment detects that a call is an emergency call, it may then initiate at step 104 a user-plane connection to a user plane location service server. At this stage appropriate routing information may be utilized in the set-up of the user plane connection. Some exemplifying possibilities for providing the user equipment with appropriate routing information and use thereof will be described in more detail later with reference to FIGS. 3 to 6.

A user plane connection may be needed for example since user equipment may need to receive assistance data to determine its location. In FIG. 2 assistance data is communicated to the user equipment at step 106. The mobile user equipment may also use the user plane for communication of information about its location or measurements to a user plane server. For example, such data may be communicated on the user plane in the case of so-called mobile station (MS) assisted A-GPS.

At step 108 information associated with location determinations may be communicated from the user equipment to the local location service server. The local location service server may then communicate information regarding the location of the target user equipment to the client application.

It is also possible that an appropriate network element rather that the user equipment first recognizes that the call is an emergency call. The network element may be, for example, a Mobile Switching Center (MSC), a Serving General Packet Radio Service Support Node (SGSN), a Gateway General Packet Radio Service Support Node (GGSN) or any other appropriate network controller. According to a possibility a Public Safety Answering Point (PSAP) provides the detecting entity. Subsequent to detection the PSAP may request from an appropriate location service entity location information related to a target mobile user equipment, i.e. a mobile user equipment which has requested for an emergency call connection. Thus the detection step may also be performed in another entity than the user equipment requesting for the connection.

A network element rather than a mobile user equipment may also initiate location procedures utilizing user plane communications. For example, a user plane location service entity 10 may initiate a user-plane connection to the mobile station 1. Location related information may then be exchanged on the user plane to obtain the location estimate for the mobile station. However, a roaming mobile station may need to be able to verify that the network entity is authorized to receive information about the location of the user equipment.

In the embodiments a roaming user equipment may use information about the user plane address of the server of the visited network to initiate user plane connection set-up or to verify that the server is authorized to be a party of exchange of information. The user plane address of the visited server may be provided to the user equipment in various manners, as will be explained below with reference to FIGS. 3 to 6.

Once a location estimate is determined, it can be conveyed to a LCS client, for example to a Public Safety Answering Point (PSAP). If a central location service entity such as a GMLC is provided in the network, the location estimate may be delivered to the client from the GMLC. This is an implementation issue, and may depend on the standards the communication system is based on.

Figure 3:
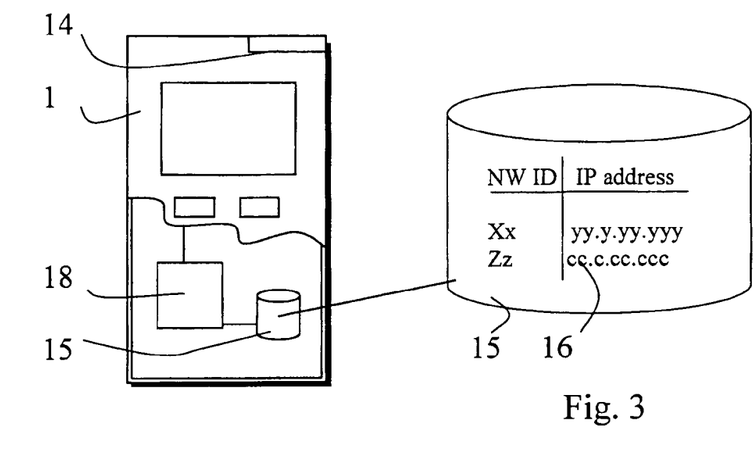
FIGS. 3 to 6 show examples for providing a user plane connection between a roaming user equipment and a network entity of a visited network.

With references to FIG. 3, a possibility is to store information about the user plane address for the location service entity of the visited network in a memory 15 of a mobile user equipment 1. The information 16 may comprise addresses of all legitimate location service entities which associate with network identities (NW ID) the user equipment 1 may roam into. For example, a user identity module may contain a list of addresses of legitimate secure user plane location (SUPL) servers of networks the subscriber is allowed to roam into. The user identity module may comprise, for example, a Subscriber Identity Module (SIM) card of a mobile station.

When a roaming mobile user equipment needs to request information from a roamed location service server, it can find the correct user plane address based on the identity of the roamed network. If the mobile user equipment receives a location request from a local location service server, it can validate the request by checking the list. If the check is positive, the request is authorized to proceed further. If the server cannot be authorized based on the list, the request is rejected. The processing of the request may be performed by processor 18 of the user equipment.

The addresses of the location service servers may be updated from the initially stored addresses. New addresses may also be added, and addresses may be deleted. The update may be done remotely, for example on request or periodically.

Figure 4:
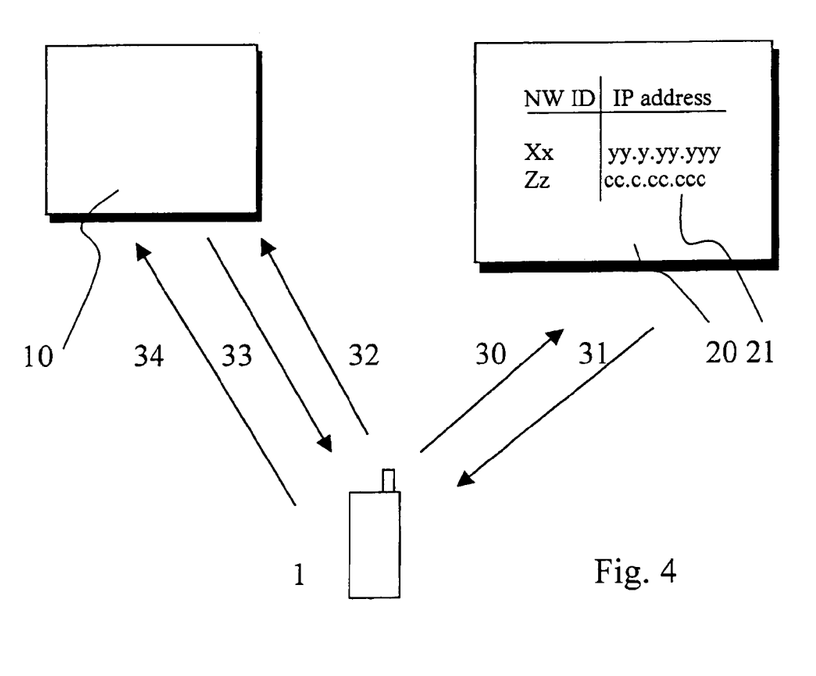

FIG. 4 shows an embodiment wherein routing information is provided for a roaming mobile user equipment 1 whenever such information is needed. In accordance with this embodiment a mobile user equipment is configured such that it knows a connection identifier of a location service server 20 of the home network thereof and may thus establish a connection to the home network server 20 from a roamed network.

The mobile user equipment 1 may provide in message 30 appropriate information identifying the roamed network to the home network server 20. The home network server 20 has a database 21 containing the IP addresses of the location service servers of other networks where roaming is possible. Based on the identity information the home network server 20 may then fetch the relevant address information and provide it in message 31 to the roaming mobile user equipment 1. The mobile user equipment 1 may then use the address information for establishing a connection to the local location service server 10 of the roamed network.

The mobile user equipment 1 may end at this stage the connection to the home server 20 and establish a new connection to the server 10 of the roamed network by sending a request 32 for location assistance. The mobile user equipment may thus obtain local and thus proper location assistance data in message 33 from the local server 10 rather than from the home network. If necessary, the mobile user equipment 1 may send in message 34 its location to the local server 10.

Figure 5:
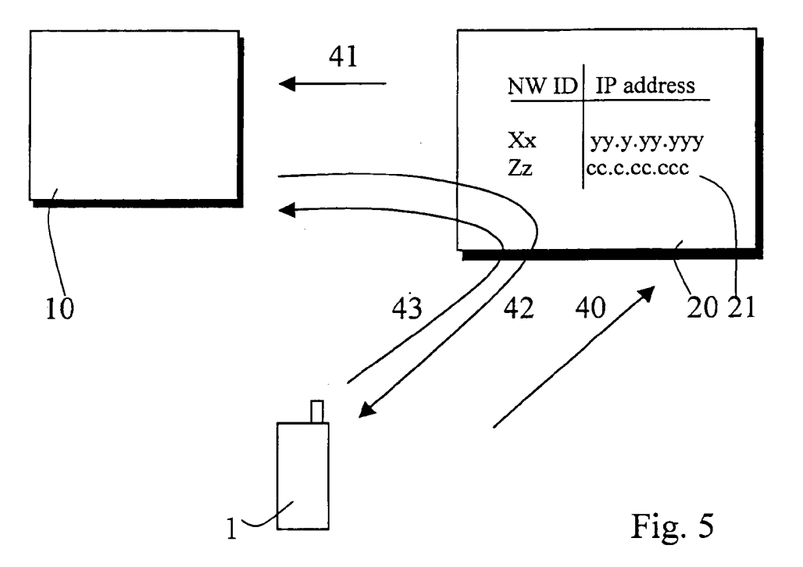

FIG. 5 shows an embodiment wherein a mobile user equipment 1 which knows the connection identifier of a location service server 20 of the home network first establishes a connection to the home network server, see message 40. Message 40 provides the home server 20 with the identity of a roamed network and a request for assistance data.

The relevant user plane address information for a location service server 10 of the visited network is made available for the home network server 20. For example, the home network server 20 may be provided with a database 21 containing the IP addresses of location service servers of other networks where roaming is possible for the mobile user equipment 1. The home network server 10 may use this information to form a connection to the server 10 of the roamed network, see message 41.

The home server 20 may then act as a transparent router between the mobile user equipment 1 and the roamed server 10, see messages 42 and 43. In message 42 the roamed server 10 is provided with a request for location assistance data. The mobile user equipment 1 may then obtain location assistance data from the roamed server 10 in message 42 routed via the home server 20. If necessary, the mobile user equipment may send its location in message 43 to the roamed server 10, for example for emergency call location purposes.

Figure 6:
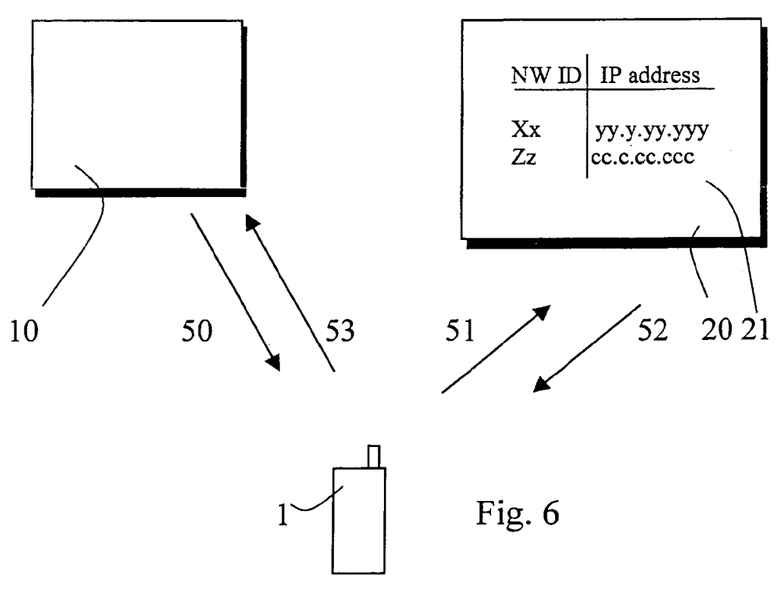

FIG. 6 shows an embodiment for handling a location request 50 by a visited location service server 10. If a mobile user equipment 1 knows only the IP address or other identifier useful for forming a user plane connection of a home network location service server 20, the mobile user equipment 1 may establish a connection to the home server 20. In message 51 the home server 20 is provided with the identity of the roamed server 10. Other additional information, for example, the identity of the roamed network may be included in this message. The home server 20 is provided with a database 21 containing IP addresses of legitimate location service servers of other networks where roaming is possible.

The home server may check if the identity of the roamed server matches any of the addresses stored in a database 21 thereof. The home server may then inform the mobile user equipment in message 52 about the results of the check. The mobile user equipment 1 may then end the connection to the home server 20. If the check indicated that the roamed server may be provided with the location information, the mobile station may then respond to the request from the location service server 10 of the roamed network, see message 53.

Figure 7:
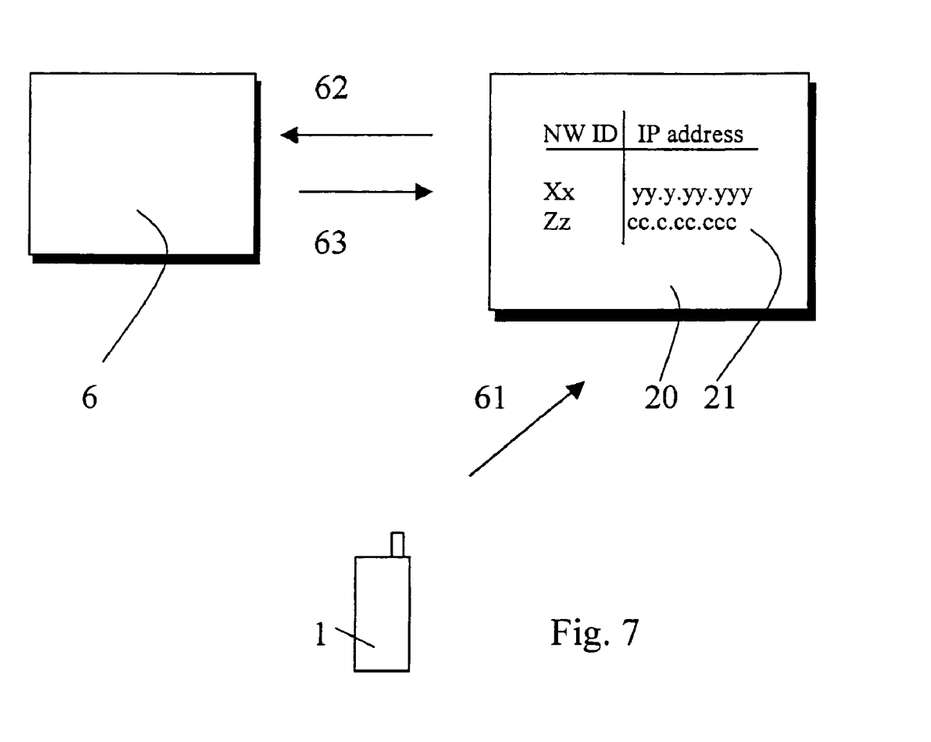
FIG. 7 shows a further embodiment.

FIG. 7 shows a further embodiment which may be useful when the mobile station 1 is not able to identify a network it has roamed into. This problem may be addressed by an arrangement wherein a home network location service server 20 contacts, upon receipt of a message 61 from the user equipment 1, a Home Location Register (HLR) 6 of the subscriber and requests by message 62 for the identifier of the roamed network. The HLR then return the identifier in message 63. This may be accomplished, for example, by using existing 3GPP standardized Mobile Application Part (MAP) signaling.

It shall be appreciated that although the above describes the invention in with reference to Internet Protocol (IP) user plane sessions, this is not the only possibility for the user plane communication. The communication may occur, for example, based on signaling by means of a PDP context, short message service (SMS), data call and so on.

It should be appreciated that whilst embodiments of the present invention have been described in relation to mobile stations, embodiments of the present invention are applicable to any other suitable type of user equipment.

It is also noted herein that while the above describes exemplifying embodiments of the invention, there are several variations and modifications which may be made to the disclosed solution without departing from the scope of the present invention as defined in the appended claims.

The invention claimed is:

1. A method for establishing a media for communications in association with a location information service provided in association with a communication system, the method comprising:
   providing user equipment with information enabling the user equipment to communicate on a direct user plane connection with a location service entity, when the user equipment is visiting the visited communication network, the visited communication network being different to a home network of the user equipment; and
   establishing the direct user plane connection in the visited communication network between the user equipment and the location service entity associated with the visited communication network;
   wherein establishing a user plane connection comprises initiating, by a location service entity of the visited network, establishment of a direct user plane connection between the location service entity of the visited network and the user equipment.

2. A method as claimed in claim 1, wherein providing user equipment with information enabling the user equipment to communicate with the location service entity comprises storing the information in the user equipment.

3. A method as claimed in claim 2, wherein storing comprises storing a plurality of user plane addresses for location service entities associated with a plurality of communication networks.

4. A method as claimed in claim 2, wherein storing comprises storing the information in a subscriber identity module of the user equipment.

5. A method as claimed in claim 1, wherein providing user equipment with information enabling the user equipment to communicate with the location service entity comprises sending to the user equipment information about an address of the location service entity associated with the visited communication network.

6. A method as claimed in claim 5, wherein sending comprises sending information about the address from a location service entity of the home network.

7. A method as claimed in claim 6, further comprising establishing a connection between the user equipment and the location service entity of the home network, receiving a user plane address of the location service entity associated with the visited network in the user equipment, and using the received user plane address for establishing a direct user plane connection between the user equipment and the location service entity of the visited network.

8. A method as claimed in claim 1, further comprising authorizing the location service entity of the visited network based on said information provided for the user equipment.

9. A method as claimed in claim 1, further comprising sending an enquiry for an identity of the visited network.

10. A method as claimed in claim 1, wherein the information comprises a user plane address of a secure user plane location server.

11. A method as claimed in claim 1, further comprising detecting whether location information is needed in association with a call initiated by the user equipment.

12. A method as claimed in claim 11, further comprising detecting that the call is an emergency call.

13. A location service arrangement for providing location information regarding user equipment in communication with a communication system, the communication system comprising a plurality of networks, one of the networks being a home network of the user equipment and at least one visited network being a network the user equipment is allowed to visit, the location service arrangement comprising a home location service entity of the user equipment, and at least one further location service entity associated with the at least one other network, wherein the user equipment is configured to use information regarding at least one user plane address of a location service entity associated with the visited network and to communicate location service information on a direct user plane connection with the location service entity associated with the visited network, when visiting the visited network and the location service entity of the visited network is configured to initiate establishment of the direct user plane connection between the location service entity of the visited network and the user equipment.

14. A location service arrangement for establishing a media for communications in association with a location information service provided in association with a communication system, comprising:
   providing means for providing user equipment with information enabling the user equipment to communicate on a direct user plane connection with a location service entity associated with a visited communication network, when the user equipment is visiting the visited communication network, the visited communication network being different to a home network of the user equipment; and
   establishing means for establishing the direct user plane connection in the visited communication network between the user equipment and the location service entity associated with the visited communication network;
   wherein the establishing means comprises initiating means for initiating, by the location service entity of the visited network, establishment of the direct user plane connection between the location service entity of the visited network and the user equipment.

15. A location service arrangement as claimed in claim 14, wherein the providing means comprises storing means for storing the information in the user equipment.

16. A location service arrangement as claimed in claim 15, wherein the storing means comprises means for storing a plurality of user plane addresses for location service entities associated with a plurality of communication networks.

17. A location service arrangement as claimed in claim 15, wherein the storing means comprises means for storing the information in a subscriber identity module of the user equipment.

18. A location service arrangement as claimed in claim 14, wherein the providing means comprises sending means for sending to the user equipment information about an address of the location service entity associated with the visited communication network.

19. A location service arrangement as claimed in claim 18, wherein the sending means comprises second sending means for sending information about the address from a location service entity of the home network.

20. A location service arrangement as claimed in claim 19, further comprising second establishing means for establishing a connection between the user equipment and the location service entity of the home network; receiving means for receiving a user plane address of the location service entity associated with the visited network in the user equipment; and third establishing means for using the received user plane address to establish a direct user plane connection between the user equipment and the location service entity of the visited network.

21. A location service arrangement as claimed in claim 14, further comprising means for authorizing the location service entity of the visited network based on said information provided for the user equipment.

22. A location service arrangement as claimed in claim 14, further comprising means for sending an enquiry for an identity of the visited network.

23. A location service arrangement as claimed in claim 14, wherein the information comprises a user plane address of a secure user plane location server.

24. A location service arrangement as claimed in claim 14, further comprising means for detecting whether location information is needed in association with a call initiated by the user equipment.

25. A location service arrangement as claimed in claim 24, further comprising means for detecting that the call is an emergency call.

26. A location service entity for providing location information regarding a user equipment in communication with a communication system, the communication system comprising a plurality of networks, one of the networks being a home network of the user equipment and at least one visited network being a network the user equipment is allowed to visit, the location service entity being associated with the visited network, wherein the location service entity is configured to initiate establishment of a user plane connection in the visited network between the location service entity and the user equipment, thereby enabling the user equipment to communicate on the user plane connection with the location service entity when the user equipment is visiting the visited network, wherein establishing a direct user plane connection includes initiating, by the location service entity of the visited network, establishment of the direct user plane connection between the location service entity of the visited network and the user equipment.

27. A method for establishing a media for communications in association with a location information service provided in association with a communication system, the method comprising:

providing user equipment with information enabling the user equipment to communicate on a direct user plane connection with a location service entity, when the user equipment is visiting the visited communication network, the visited communication network being different to a home network of the user equipment; and establishing the direct user plane connection in the visited communication network between the user equipment and the location service entity associated with the visited communication network;

wherein the providing of the user equipment with information enabling the user equipment to communicate with the location service entity comprises sending to the user equipment, from a location service entity of the home network, information about an address of the location service entity associated with the visited communication network, and further comprising establishing a connection between the user equipment and the location service entity of the home network, receiving a user plane address of the location service entity associated with the visited network in the user equipment, and using the received user plane address for establishing a direct user plane connection between the user equipment and the location service entity of the visited network.

28. A location service arrangement for establishing a media for communications in association with a location information service provided in association with a communication system, comprising:

providing means for providing user equipment with information enabling the user equipment to communicate on a direct user plane connection with a location service entity associated with a visited communication network, when the user equipment is visiting the visited communication network, the visited communication network being different to a home network of the user equipment; and establishing means for establishing the direct user plane connection in the visited communication network between the user equipment and the location service entity associated with the visited communication network;

wherein the providing means comprises sending means for sending to the user equipment, from a location service entity of the home network, information about an address of the location service entity associated with the visited communication network;

and the arrangement further comprises second establishing means for establishing a connection between the user equipment and the location service entity of the home network; receiving means for receiving a user plane address of the location service entity associated with the visited network in the user equipment; and third establishing means for using the received user plane address to establish a direct user plane connection between the user equipment and the location service entity of the visited network.

* * * * *